United States Patent
Wu et al.

(10) Patent No.: US 12,098,821 B2
(45) Date of Patent: Sep. 24, 2024

(54) ROTARY TYPE STAR PROJECTION LAMP WITH AUDIO PLAYING AND ATMOSPHERE SET-OFF FUNCTIONS

(71) Applicant: Shenzhen Glocusent Technology Co., Ltd., Shenzhen (CN)

(72) Inventors: Manchuan Wu, Shenzhen (CN); Zhengping Li, Shenzhen (CN); Shijia Xiao, Shenzhen (CN); Yuling Fang, Shenzhen (CN); Fafeng Li, Shenzhen (CN)

(73) Assignee: Shenzhen Glocusent Technology Co., Ltd.

( * ) Notice: Subject to any disclaimer, the term of this patent is extended or adjusted under 35 U.S.C. 154(b) by 104 days.

(21) Appl. No.: 18/111,534

(22) Filed: Feb. 18, 2023

(65) Prior Publication Data
US 2023/0194070 A1 Jun. 22, 2023

(30) Foreign Application Priority Data
Dec. 7, 2022 (CN) .......................... 202211563970.3

(51) Int. Cl.
*F21V 14/08* (2006.01)
*F21S 10/00* (2006.01)
(Continued)

(52) U.S. Cl.
CPC ............ *F21V 14/08* (2013.01); *F21S 10/007* (2013.01); *F21V 3/049* (2013.01); *F21V 33/0056* (2013.01); *F21V 14/02* (2013.01); *F21V 14/025* (2013.01); *F21V 14/085* (2013.01); *F21V 21/14* (2013.01); *F21V 21/145* (2013.01); *F21V 21/22* (2013.01); *F21V 21/26* (2013.01); *F21V 21/28* (2013.01); *F21V 21/29* (2013.01); *F21V 21/30* (2013.01); *F21V 21/34* (2013.01); *F21W 2121/008* (2013.01); *G03B 21/26* (2013.01)

(58) Field of Classification Search
CPC ........ F21V 21/14; F21V 21/145; F21V 21/15; F21V 21/22; F21V 21/26; F21V 21/28; F21V 21/29; F21V 21/30; F21V 21/34; F21V 33/0056; F21V 14/02; F21V 14/025; F21V 14/04; F21V 14/045; F21V 14/06; F21V 14/065; F21V 14/08; F21V 14/085; F21S 10/007; G03B 21/26
See application file for complete search history.

(56) References Cited

U.S. PATENT DOCUMENTS

11,221,117 B1 * 1/2022 Xu .......................... F21V 5/04
11,281,083 B1 * 3/2022 Xin ...................... G03B 21/145
(Continued)

*Primary Examiner* — Colin J Cattanach
(74) *Attorney, Agent, or Firm* — Jose Cherson Weissbrot (57) ABSTRACT

The present disclosure discloses a rotary type star projection lamp with an audio playing and atmosphere set-off functions, and belongs to the technical field of star projection lamps. The rotary type star projection lamp includes a lamp house and a base, wherein a top end of the lamp house is connected with a cover plate; the cover plate is provided with a star lampshade and two cloud lampshades; a side wall of an inner bottom of the lamp house is connected with a drive motor; an output end of the drive motor is connected with a chain wheel assembly through a drive shaft; and a star light scattering sheet and two cloud light scattering sheets are respectively arranged above the chain wheel assembly.

10 Claims, 8 Drawing Sheets

(51) Int. Cl.
*F21V 3/04* (2018.01)
*F21V 14/02* (2006.01)
*F21V 21/14* (2006.01)
*F21V 21/22* (2006.01)
*F21V 21/26* (2006.01)
*F21V 21/28* (2006.01)
*F21V 21/29* (2006.01)
*F21V 21/30* (2006.01)
*F21V 21/34* (2006.01)
*F21V 33/00* (2006.01)
*F21W 121/00* (2006.01)
*G03B 21/26* (2006.01)

(56) References Cited

U.S. PATENT DOCUMENTS

| | | | |
|---|---|---|---|
| 11,512,841 B1* | 11/2022 | Jiang | F21V 21/22 |
| 11,585,492 B1* | 2/2023 | Pang | F21V 9/00 |
| 2014/0003029 A1 | 1/2014 | Li et al. | |
| 2014/0369074 A1 | 12/2014 | Tian | |
| 2016/0265757 A1 | 9/2016 | Hsieh et al. | |
| 2023/0265989 A1* | 8/2023 | Liu | F21V 5/007 |
| | | | 362/269 |

* cited by examiner

ROTARY TYPE STAR PROJECTION LAMP WITH AUDIO PLAYING AND ATMOSPHERE SET-OFF FUNCTIONS

TECHNICAL FIELD

The present disclosure relates to the technical field of star projection lamps, in particular to a rotary type star projection lamp with audio playing and atmosphere set-off functions.

BACKGROUND

A projection lamp is a new multi-angle projection lamp that combines a lighting technology with a video technology to realize image processing, image angle rotation, programming and image projection functions, as well as image processing integration. Projection lamps can project different video images respectively onto multiple lifting gauze screens in a performance region of a stage, and onto props with various shapes. A small-sized star projection lamp is used to project star images, which is mostly used for family gatherings, and can create an atmosphere sense required by reading books and listening to music when lying in the bed.

The star sky projection lamp currently used usually completes adjustment of a projection angle or rotation by changing an angle of light and tilting, so that generally only one form of rotation can be completed, which is relatively simple and cannot meet the requirements of variable use effects.

SUMMARY

The present disclosure aims to solve the problem that a star projection lamp in the prior art has a single mode change, and provide a rotary type star projection lamp with audio playing and atmosphere set-off functions.

In order to achieve the foregoing purpose, the present disclosure adopts the following technical solution:

A rotary type star projection lamp with the audio playing and atmosphere set-off functions includes a lamp house and a base, wherein a top end of the lamp house is connected with a cover plate; the cover plate is provided with a star lampshade and two cloud lampshades; a side wall of an inner bottom of the lamp house is connected with a drive motor; an output end of the drive motor is connected with a chain wheel assembly through a drive shaft; a star light scattering sheet and two cloud light scattering sheets are respectively arranged above the chain wheel assembly; a printed circuit board (PCB) and a helical gear are respectively arranged on two opposite sides of the drive motor; a helical toothed ring is arranged below the helical gear; a bottom end of the helical toothed ring is fixedly connected with a base plate through a plurality of telescopic rods; a top end of the base is connected with a universal ball through a ball tile; and a limiting assembly is arranged on a side wall of the ball tile.

Preferably, a top end of the lamp house is fixedly connected with a bottom end of the cover plate; a star light transmittance hole and two cloud light transmittance holes are respectively formed in the cover plate; an inner side wall of the star light transmittance hole is fixedly connected with a side wall of the star lampshade; and inner side walls of the cloud light transmittance holes are fixedly connected with side walls of the cloud lampshades.

Preferably, the chain wheel assembly is composed of a driving wheel, two driven wheels and a transmission chain belt; the two driven wheels are respectively located on two opposite sides of the driving wheel and are connected through the transmission chain belt; a bottom end of the drive motor is fixedly connected with the side wall of the inner bottom of the lamp house; and the output end of the drive motor is fixedly connected with a bottom end of the driving wheel through the drive shaft.

Preferably, a top end of the driving wheel is fixedly connected with a lamp tube; an inner side wall of a top end of the lamp tube is fixedly connected with a side wall of the star light scattering sheet; an outer side wall of the lamp tube is fixedly connected with a main gear; and a pinion is arranged on one side of the main gear.

Preferably, top ends of the two driven wheels are both fixedly connected with bottom ends of the cloud light scattering sheets through fixing rods; the inner side wall of the lamp house is fixedly connected with two opposite lenses; illumination lamps are arranged below the lenses; and the cloud light scattering sheets, the lenses and the illumination lamps are located on the same vertical plane.

Preferably, two limiting plates are respectively arranged at diagonals of the PCB; bottom ends of the limiting plates are fixedly connected with the side wall of the inner bottom of the lamp house; a top end of the PCB is connected with a control board through a wire; a top end of the control board is fixedly connected with bottom ends of the illumination lamps; and the top end of the PCB is fixedly connected with a side wall of the drive motor through a wire.

Preferably, the pinion is meshed with the main gear; a bottom end of the pinion is fixedly connected with a vertical bevel gear through a rotating shaft; a transverse bevel gear meshed with the vertical bevel gear is arranged on one side of the vertical bevel gear; an outer side wall of the rotating shaft is rotatably connected with a fixed ferrule; and the transverse bevel gear is fixedly connected with a helical gear through a transverse shaft.

Preferably, the bevel gear is arranged in a square hole formed in a bottom end of the lamp house; the bevel gear is meshed with the helical toothed ring; a top end of the base plate is fixedly connected with a supporting rod; and a top end of the supporting rod is rotatably connected with the bottom end of the lamp house.

Preferably, a bottom end of the base plate is fixedly connected with a top end of the universal ball; an outer side wall of the universal ball is rotatably connected with an inner side wall of the ball tile; a diameter of an end surface of the ball tile is less than the maximum diameter of the universal ball; and an outer side wall of the ball tile is fixedly connected with an inner side wall of a groove formed in the top end of the base.

Preferably, the limiting assembly is composed of a fixed plate and a threaded rod; a threaded hole is formed in the fixed plate; an inner side wall of the threaded hole is in threaded connection with an outer side wall of the threaded rod; a round hole is formed in a side wall of the ball tile; and a plurality of sound holes are formed in a side wall of the base in an arrayed manner.

Compared with the existing art, the present disclosure has the following beneficial effects.

1. In the solution, by the arrangement of the star light scattering sheet and the cloud light scattering sheets, a primary mode of the star projection lamp can be enabled to make a star pattern and a cloud pattern rotate in a fixed region, which is applicable to more relaxed scenarios such as listening light music or reading books.

2. In the solution, by the arrangement of the helical gear and the helical toothed ring, an advanced mode of the star projection lamp can be enabled to make the star pattern projected to the lamp house to revolve to create an active atmosphere, which is applicable to family gatherings and other scenarios.

3. In the solution, by the arrangement of the universal ball and the ball tile, different projection angles can be selected by a user according to places to be projected, which improves the applicability of the star projection lamp.

In the drawings: 1: lamp house; 2: base; 3: cover plate; 4: star lampshade; 5: cloud lampshade; 6: drive motor; 7: driving wheel; 8: driven wheel; 9: transmission chain belt; 10: main gear; 11: star light scattering sheet; 12: cloud light scattering sheet; 13: lens; 14: PCB; 15: limiting plate; 16: control panel; 17: illumination lamp; 18: pinion; 19: fixed ferrule; 20: vertical bevel gear; 21: transverse bevel gear; 22: helical gear; 23: helical toothed ring; 24: telescopic rod; 25: base plate; 26: supporting rod; 27: universal ball; 28: ball tile; 29: fixed plate; 30: threaded rod; and 31: sound hole.

DETAILED DESCRIPTION OF THE EMBODIMENTS

The technical solutions in the embodiments of the present disclosure will be clearly and completely described below in combination with the accompanying drawings. Obviously, the described embodiments are only a part of the embodiments of the present invention, rather than all the embodiments. Based on the embodiments in the present invention, all other embodiments obtained by those of ordinary skill in the art without creative work fall within the protection scope of the present invention.

Embodiment I

Referring to FIG. 1 to FIG. 8, a rotary type star projection lamp with an audio playing and atmosphere set-off functions includes a lamp house 1 and a base 2. A top end of the lamp house 1 is connected with a cover plate 3. The cover plate 3 is provided with a star lampshade 4 and two cloud lampshades 5. A side wall of an inner bottom of the lamp house 1 is connected with a drive motor 6. An output end of the drive motor 6 is connected with a chain wheel assembly through a drive shaft. A star light scattering sheet 11 and two cloud light scattering sheets 12 are respectively arranged above the chain wheel assembly.

Further, a top end of the lamp house 1 is fixedly connected with a bottom end of the cover plate 3. A star light transmittance hole and two cloud light transmittance holes are respectively formed in the cover plate 3. An inner side wall of the star light transmittance hole is fixedly connected with a side wall of the star lampshade 4. Inner side walls of the cloud light transmittance holes are fixedly connected with side walls of the cloud lampshades 5. The chain wheel assembly is composed of a driving wheel 7, two driven wheels 8 and a transmission chain belt 9. The two driven wheels 8 are respectively located on two opposite sides of the driving wheel 7 and are connected through the transmission chain belt 9. A bottom end of the drive motor 6 is fixedly connected with the side wall of the inner bottom of the lamp house 1. The output end of the drive motor 6 is fixedly connected with a bottom end of the driving wheel 7 through the drive shaft. A top end of the driving wheel 7 is fixedly connected with a lamp tube. An inner side wall of a top end of the lamp tube is fixedly connected with a side wall of the star light scattering sheet 11. An outer side wall of the lamp tube is fixedly connected with a main gear 10. A pinion 18 is arranged on one side of the main gear 10. Top ends of the two driven wheels 8 are both fixedly connected with bottom ends of the cloud light scattering sheets 12 through fixing rods. The inner side wall of the lamp house 1 is fixedly connected with two opposite lenses 13. Illumination lamps 17 are arranged below the lenses 13. The cloud light scattering sheets 12, the lenses 13 and the illumination lamps 17 are located on the same vertical plane. Two limiting plates 15 are respectively arranged at diagonals of the PCB 14. Bottom ends of the limiting plates 15 are fixedly connected with the side wall of the inner bottom of the lamp house 1. A top end of the PCB 14 is connected with a control board 16 through a wire. A top end of the control board 16 is fixedly connected with bottom ends of the illumination lamps 17. The top end of the PCB 14 is fixedly connected with a side wall of the drive motor 6 through a wire.

Figure 1:
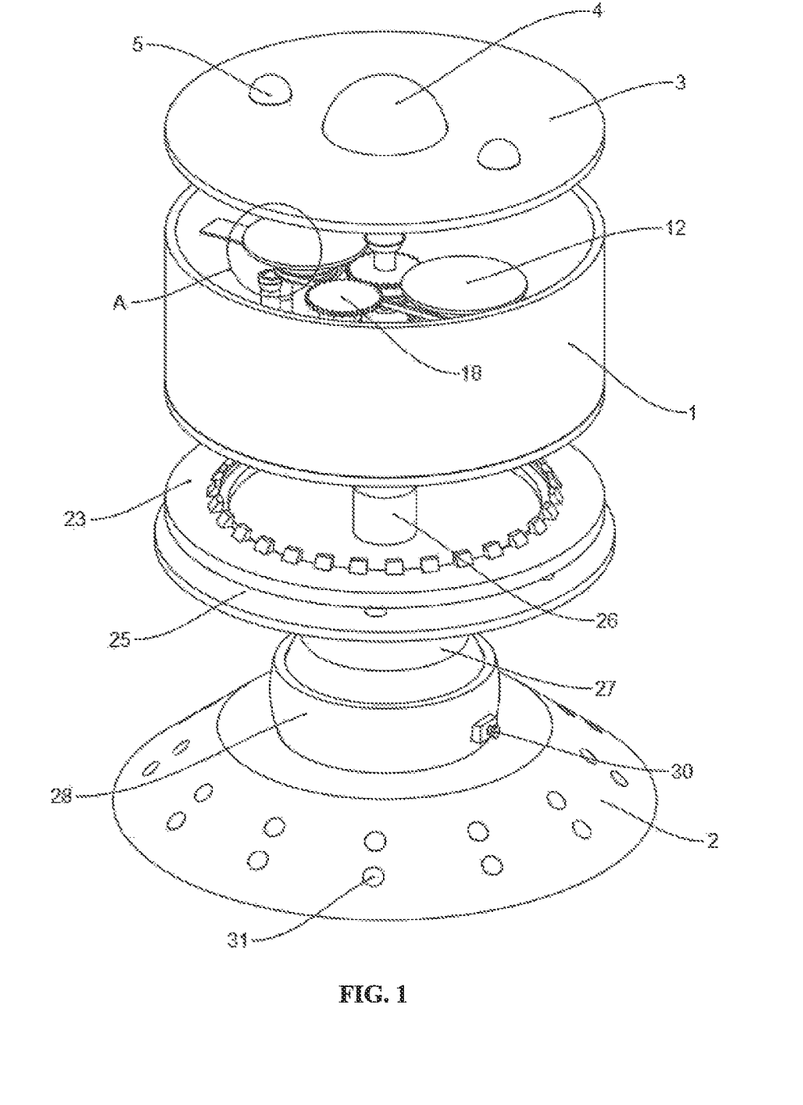
FIG. 1 is a schematic structural diagram of a rotary type star projection lamp with audio playing and atmosphere set-off functions provided by the present disclosure.
Figure 2:
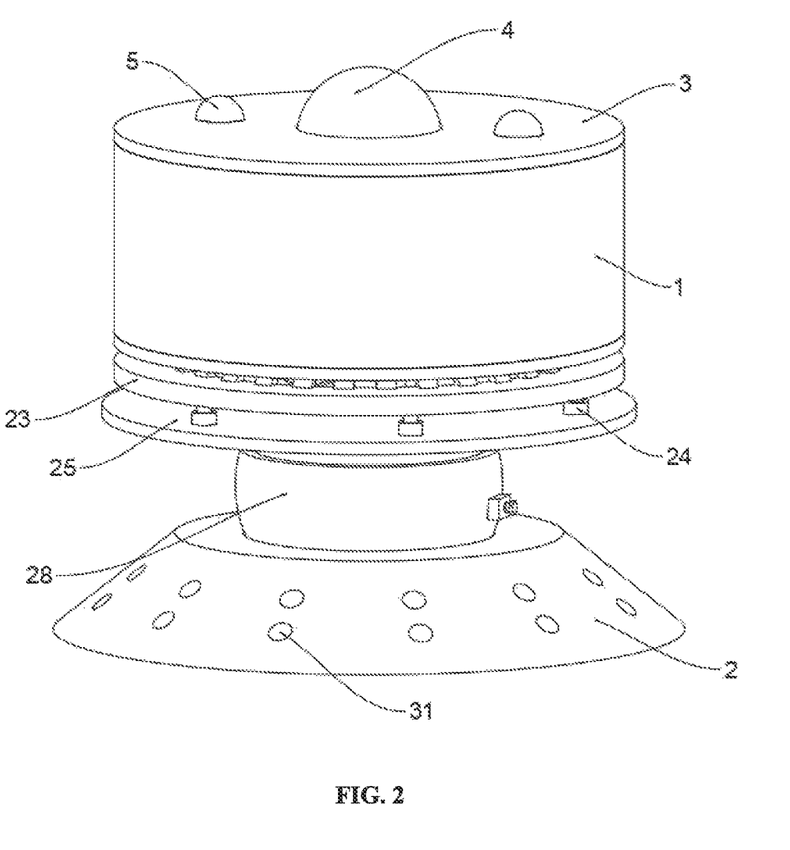
FIG. 2 is a schematic structural diagram of star lampshade in a rotary type star projection lamp with audio playing and atmosphere set-off functions provided by the present disclosure.
Figure 4:
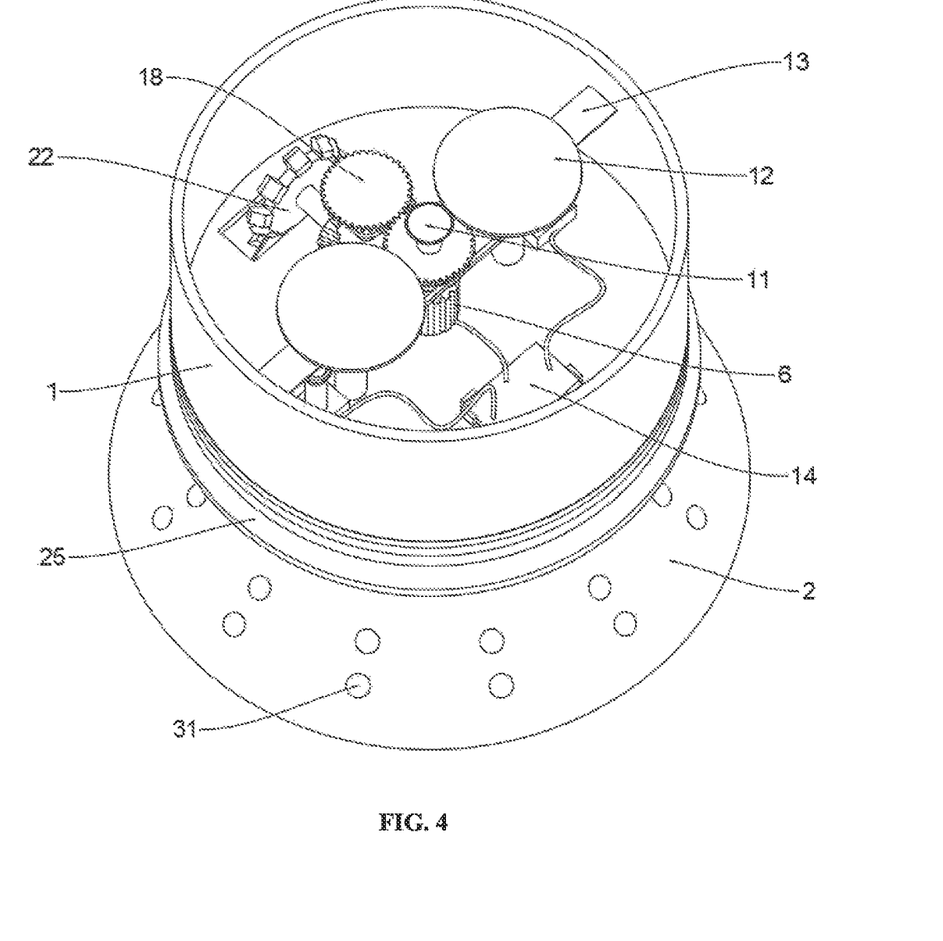
FIG. 4 is a schematic structural diagram of a star light scattering sheet in a rotary type star projection lamp with audio playing and atmosphere set-off functions provided by the present disclosure.
Figure 5:
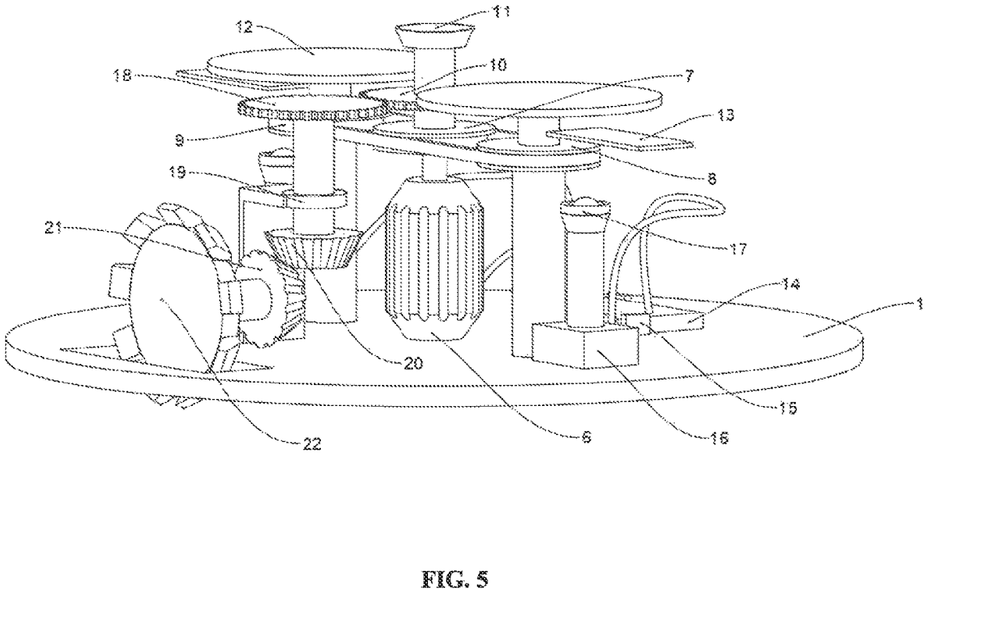
FIG. 5 is a schematic structural diagram of illumination lamps in a rotary type star projection lamp with audio playing and atmosphere set-off functions provided by the present disclosure.

It should be noted that the drive motor 6 is started to drive the drive shaft to rotate. The drive shaft rotates to drive the driving wheel 7 to rotate. The driving wheel 7 rotates to drive the driven wheels 8 on both sides to rotate through the transmission chain belt 9. The driving wheel 7 rotates to drive the lamp tube above to rotate. A laser emitter is arranged in the lamp tube, and the rotation of the lamp tube will drive the star light scattering sheet 11 above to rotate, so that laser light emitted through the laser emitter is projected by the star light scattering sheet 11 to form a rotating star pattern. The rotation of the driven wheels 8 will drive the cloud light scattering sheets 12 above to rotate. At the same time, the PCB 14 enables the illumination lamps 17 to emit light through the control panel 16, and the lenses 13 and the cloud light scattering sheets 12 project a changing cloud pattern. The star pattern and the cloud pattern are combined to create a star atmosphere. The drive motor 6 is KYDAS96300-1E.

A further advantage of the above is as follows: In this way, a primary mode of the star projection lamp can be enabled to make a star pattern and a cloud pattern rotate in a fixed region, which is applicable to more relaxed scenarios such as listening light music or reading books.

Embodiment II

Referring to FIG. 1 to FIG. 8, the PCB 14 and a helical gear 22 are respectively arranged on two opposite sides of the drive motor 6. A helical toothed ring 23 is arranged below the helical gear 22. A bottom end of the helical toothed ring 23 is fixedly connected with a base plate 25 through a plurality of telescopic rods 24.

Figure 6:
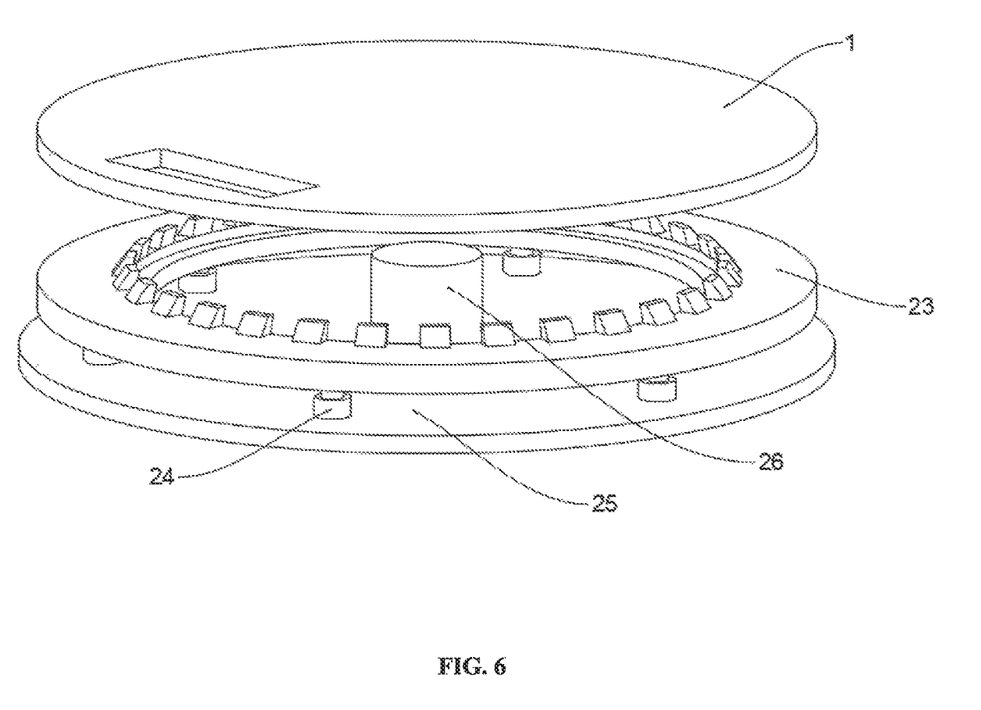
FIG. 6 is a schematic structural diagram of a helical toothed ring in a rotary type star projection lamp with audio playing and atmosphere set-off functions provided by the present disclosure.

Further, the pinion 18 is meshed with the main gear 10. A bottom end of the pinion 18 is fixedly connected with a vertical bevel gear 20 through a rotating shaft. A transverse bevel gear 21 meshed with the vertical bevel gear is arranged on one side of the vertical bevel gear 20. An outer side wall of the rotating shaft is rotatably connected with a fixed ferrule 19. The transverse bevel gear 21 is fixedly connected with a helical gear 22 through a transverse shaft. The bevel gear 22 is arranged in a square hole formed in a bottom end of the lamp house 1. The bevel gear 22 is meshed with the helical toothed ring 23. A top end of the base plate 25 is fixedly connected with a supporting rod 26. A top end of the supporting rod 26 is rotatably connected with the bottom end of the lamp house 1.

It should be noted that the rotation of the lamp tube will drive the main gear 10 to rotate. The rotation of the main gear 10 will drive the pinion 18, meshed to one side, to rotate. The rotation of the pinion 18 will drive the vertical bevel gear 20 below to rotate through the rotating shaft. The rotation of the vertical bevel gear 20 will drive the transverse bevel gear 21 meshed thereto to rotate. Therefore, the transverse bevel gear 21 drives the helical gear 22 to rotate through the transverse shaft. The outer side wall of the transverse shaft is connected to the inner side wall of the lamp house 1 through a connection plate rotatably connected thereto. The helical gear 22 will circumferentially move on the helical toothed ring 23 meshed thereto while rotating, thus driving the whole lamp house 1 to do circumferential motion. Whether the lamp house 1 rotates is adjusted by means of adjusting a height of the helical toothed ring 23 through the telescopic rods 24.

A further advantage of the above is as follows: In this way, an advanced mode of the star projection lamp can be enabled to make the star pattern projected to the lamp house 1 to revolve to create an active atmosphere, which is applicable to family gatherings and other scenarios.

Embodiment III

Referring to FIG. 1 to FIG. 8, a top end of the base 2 is connected with a universal ball 27 through a ball tile 28, and a limiting assembly is arranged on a side wall of the ball tile 28.

Figure 3:
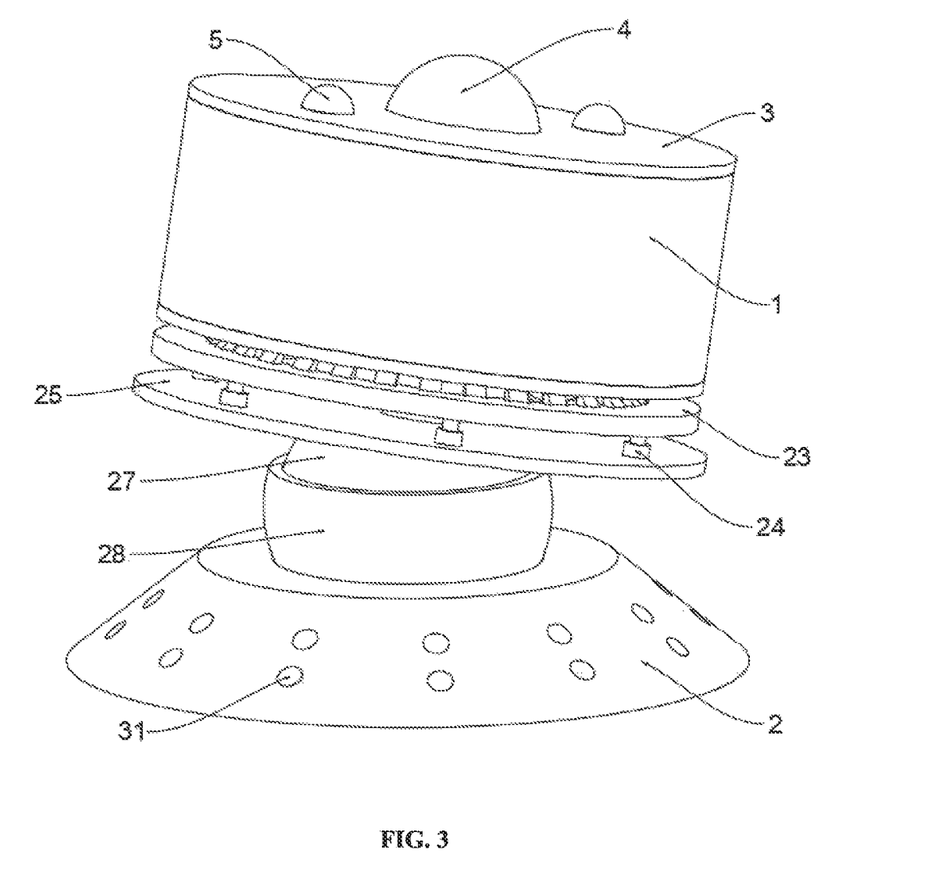
FIG. 3 is a schematic structural diagram of a universal ball in a rotary type star projection lamp with audio playing and atmosphere set-off functions provided by the present disclosure.
Figure 7:
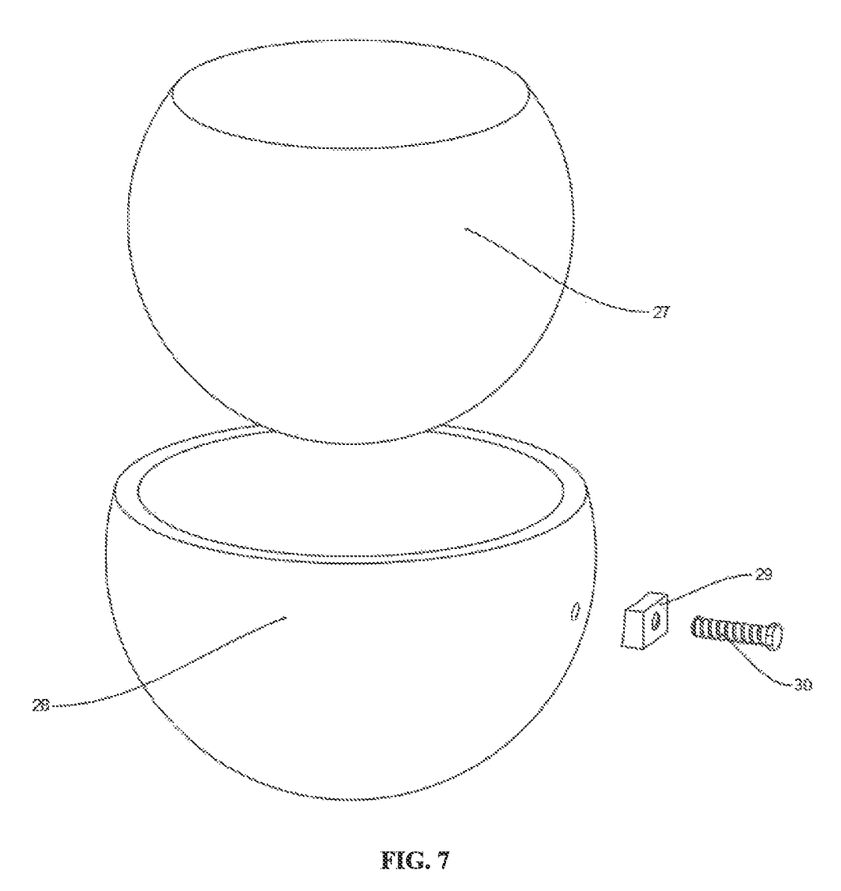
FIG. 7 is a schematic structural diagram of a ball tile in a rotary type star projection lamp with audio playing and atmosphere set-off functions provided by the present disclosure.
Figure 8:
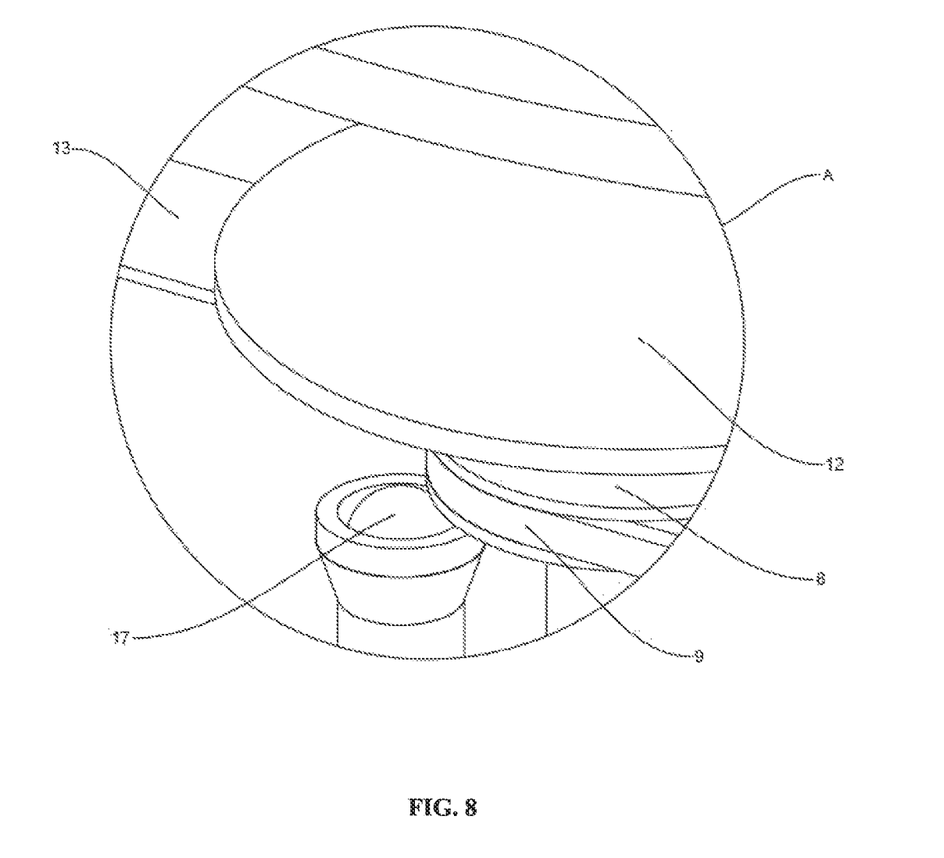
FIG. 8 is an enlarged diagram of Part A in FIG. 1.

Further, a bottom end of the base plate 25 is fixedly connected with a top end of the universal ball 27. An outer side wall of the universal ball 27 is rotatably connected with an inner side wall of the ball tile 28. A diameter of an end surface of the ball tile 28 is less than the maximum diameter of the universal ball 27. An outer side wall of the ball tile 28 is fixedly connected with an inner side wall of a groove formed in the top end of the base 2. The limiting assembly is composed of a fixed plate 29 and a threaded rod 30. A threaded hole is formed in the fixed plate 29. An inner side wall of the threaded hole is in threaded connection with an outer side wall of the threaded rod 30; a round hole is formed in a side wall of the ball tile 28. A plurality of sound holes 31 are formed in a side wall of the base 2 in an arrayed manner.

It should be noted that the threaded rod 30 is outwards rotated, which can relieve the limitation to the universal ball 27. An inclination angle of the lamp house 1 is then changed by means of rotation between the universal ball 27 and the ball tile 28, thus changing a projection angle of the star pattern. The diameter of the end surface of the ball tile 28 is less than the maximum diameter of the universal ball 27, which can prevent the universal ball 27 from being separated from the ball tile 28 during rotation. After the angle adjustment, the threaded rod 30 on the fixed plate 29 is inwards rotated to limit the universal ball 27 again. An end portion of the threaded rod 30 is provided with a soft rubber block, which increases a friction force with the side wall of the universal ball 27 to facilitate the limitation. A user can play, according to a need, surround music using the sound holes 31 arrayed on the base 2.

A further advantage of the above is as follows: Different projection angles can be selected by the user according to places to be projected, which improves the applicability of the star projection lamp.

In the present disclosure, during use, the drive motor 6 is started to drive the drive shaft to rotate. The drive shaft rotates to drive the driving wheel 7 to rotate. The driving wheel 7 rotates to drive the driven wheels 8 on both sides to rotate through the transmission chain belt 9. The driving wheel 7 rotates to drive the lamp tube above to rotate. A laser emitter is arranged in the lamp tube, and the rotation of the lamp tube will drive the star light scattering sheet 11 above to rotate, so that laser light emitted through the laser emitter is projected by the star light scattering sheet 11 to form a rotating star pattern. The rotation of the driven wheels 8 will drive the cloud light scattering sheets 12 above to rotate. At the same time, the PCB 14 enables the illumination lamps 17 to emit light through the control panel 16, and the lenses 13 and the cloud light scattering sheets 12 project a changing cloud pattern. The star pattern and the cloud pattern are combined to create a star atmosphere. In this way, a primary mode of the star projection lamp can be enabled to make a star pattern and a cloud pattern rotate in a fixed region, which is applicable to more relaxed scenarios such as listening light music or reading books.

The rotation of the lamp tube will drive the main gear 10 to rotate. The rotation of the main gear 10 will drive the pinion 18, meshed to one side, to rotate. The rotation of the pinion 18 will drive the vertical bevel gear 20 below to rotate through the rotating shaft. The rotation of the vertical bevel gear 20 will drive the transverse bevel gear 21 meshed thereto to rotate. Therefore, the transverse bevel gear 21 drives the helical gear 22 to rotate through the transverse shaft. The outer side wall of the transverse shaft is connected to the inner side wall of the lamp house 1 through a connection plate rotatably connected thereto. The helical gear 22 will circumferentially move on the helical toothed ring 23 meshed thereto while rotating, thus driving the whole lamp house 1 to do circumferential motion. Whether the lamp house 1 rotates is adjusted by means of adjusting a height of the helical toothed ring 23 through the telescopic rods 24. In this way, an advanced mode of the star projection lamp can be enabled to make the star pattern projected to the lamp house 1 to revolve to create an active atmosphere, which is applicable to family gatherings and other scenarios.

The threaded rod 30 is outwards rotated, which can relieve the limitation to the universal ball 27. An inclination angle of the lamp house 1 is then changed by means of rotation between the universal ball 27 and the ball tile 28, thus changing a projection angle of the star pattern. The diameter of the end surface of the ball tile 28 is less than the maximum diameter of the universal ball 27, which can prevent the universal ball 27 from being separated from the ball tile 28 during rotation. After the angle adjustment, the threaded rod 30 on the fixed plate 29 is inwards rotated to limit the universal ball 27 again. An end portion of the threaded rod 30 is provided with a soft rubber block, which increases a friction force with the side wall of the universal ball 27 to facilitate the limitation. A user can play, according to a need, surround music using the sound holes 31 arrayed on the base 2.

The above descriptions are only specific preferred implementation modes of the present disclosure, but the scope of protection of the present disclosure is not limited thereto. For any person skilled in the art, within the technical scope disclosed by the present disclosure, equivalent substitutions or changes made according to the technical solution of the present disclosure and an inventive idea of the present disclosure shall all fall within the scope of protection of the present disclosure.

What is claimed is:

1. A rotary type star projection lamp with audio playing and atmosphere set-off functions, comprising a lamp house (1) and a base (2), wherein a top end of the lamp house (1) is connected with a cover plate (3); the cover plate (3) is provided with a star lampshade (4) and two cloud lampshades (5); a side wall of an inner bottom of the lamp house (1) is connected with a drive motor (6); an output end of the drive motor (6) is connected with a chain wheel assembly through a drive shaft; a star light scattering sheet (11) and two cloud light scattering sheets (12) are respectively arranged above the chain wheel assembly; a printed circuit board (PCB) (14) and a helical gear (22) are respectively arranged on two opposite sides of the drive motor (6); a helical toothed ring (23) is arranged below the helical gear (22); a bottom end of the helical toothed ring (23) is fixedly connected with a base plate (25) through a plurality of telescopic rods (24); a top end of the base (2) is connected with a universal ball (27) through a ball tile (28); and a limiting assembly is arranged on a side wall of the ball tile (28).

2. The rotary type star projection lamp with audio playing and atmosphere set-off functions according to claim 1, wherein a top end of the lamp house (1) is fixedly connected with a bottom end of the cover plate (3); a star light transmittance hole and two cloud light transmittance holes are respectively formed in the cover plate (3); an inner side wall of the star light transmittance hole is fixedly connected with a side wall of the star lampshade (4); and inner side walls of the cloud light transmittance holes are fixedly connected with side walls of the cloud lampshades (5).

3. The rotary type star projection lamp with audio playing and atmosphere set-off functions according to claim 1, wherein the chain wheel assembly is composed of a driving wheel (7), two driven wheels (8) and a transmission chain belt (9); the two driven wheels (8) are respectively located on two opposite sides of the driving wheel (7) and are connected through the transmission chain belt (9); a bottom end of the drive motor (6) is fixedly connected with the side wall of the inner bottom of the lamp house (1); and the output end of the drive motor (6) is fixedly connected with a bottom end of the driving wheel (7) through the drive shaft.

4. The rotary type star projection lamp with audio playing and atmosphere set-off functions according to claim 3, wherein a top end of the driving wheel (7) is fixedly connected with a lamp tube; an inner side wall of a top end of the lamp tube is fixedly connected with a side wall of the star light scattering sheet (11); an outer side wall of the lamp tube is fixedly connected with a main gear (10); and a pinion (18) is arranged on one side of the main gear (10).

5. The rotary type star projection lamp with audio playing and atmosphere set-off functions according to claim 4, wherein top ends of the two driven wheels (8) are both fixedly connected with bottom ends of the cloud light scattering sheets (12) through fixing rods; the inner side wall of the lamp house (1) is fixedly connected with two opposite lenses (13); illumination lamps (17) are arranged below the lenses (13); and the cloud light scattering sheets (12), the lenses (13) and the illumination lamps (17) are located on the same vertical plane.

6. The rotary type star projection lamp with audio playing and atmosphere set-off functions according to claim 5, wherein two limiting plates (15) are respectively arranged at diagonals of the PCB (14); bottom ends of the limiting plates (15) are fixedly connected with the side wall of the inner bottom of the lamp house (1); a top end of the PCB (14) is connected with at least one control board (16) through a wire; a top end of the at least one control board (16) is fixedly connected with a bottom end of at least one of the illumination lamps (17); and the top end of the PCB (14) is fixedly connected with a side wall of the drive motor (6) through a wire.

7. The rotary type star projection lamp with audio playing and atmosphere set-off functions according to claim 4, wherein the pinion (18) is meshed with the main gear (10); a bottom end of the pinion (18) is fixedly connected with a vertical bevel gear (20) through a rotating shaft; a transverse bevel gear (21) meshed with the vertical bevel gear is arranged on one side of the vertical bevel gear (20); an outer side wall of the rotating shaft is rotatably connected with a fixed ferrule (19); and the transverse bevel gear (21) is fixedly connected with a helical gear (22) through a transverse shaft.

8. The rotary type star projection lamp with audio playing and atmosphere set-off functions according to claim 1, wherein the bevel gear (22) is arranged in a square hole formed in a bottom end of the lamp house (1); the bevel gear (22) is meshed with the helical toothed ring (23); a top end of the base plate (25) is fixedly connected with a supporting rod (26); and a top end of the supporting rod (26) is rotatably connected with the bottom end of the lamp house (1).

9. The rotary type star projection lamp with audio playing and atmosphere set-off functions according to claim 1, wherein a bottom end of the base plate (25) is fixedly connected with a top end of the universal ball (27); an outer side wall of the universal ball (27) is rotatably connected with an inner side wall of the ball tile (28); a diameter of an end surface of the ball tile (28) is less than the maximum diameter of the universal ball (27); and an outer side wall of the ball tile (28) is fixedly connected with an inner side wall of a groove formed in the top end of the base (2).

10. The rotary type star projection lamp with audio playing and atmosphere set-off functions according to claim 1, wherein the limiting assembly is composed of a fixed plate (29) and a threaded rod (30); a threaded hole is formed in the fixed plate (29); an inner side wall of the threaded hole is in threaded connection with an outer side wall of the threaded rod (30); a round hole is formed in a side wall of the ball tile (28); and a plurality of sound holes (31) are formed in a side wall of the base (2) in an arrayed manner.

* * * * *